United States Patent [19]
Hatayama

[11] Patent Number: 5,327,527
[45] Date of Patent: Jul. 5, 1994

[54] METHOD OF AND APPARATUS FOR PROCESSING IMAGE DATA

[75] Inventor: Fumihiro Hatayama, Kyoto, Japan

[73] Assignee: Dainippon Screen Mfg. Co., Ltd., Kyoto, Japan

[21] Appl. No.: 751,453

[22] Filed: Aug. 28, 1991

[30] Foreign Application Priority Data
Sep. 18, 1990 [JP] Japan .................................. 2-248122

[51] Int. Cl.$^5$ .............................................. G06F 3/12
[52] U.S. Cl. .................................................. 395/133
[58] Field of Search ....................... 395/133, 140, 141; 340/734, 729; 364/200 MS File, 900 MS File; 345/117, 118, 127

[56] References Cited
U.S. PATENT DOCUMENTS

| 4,951,228 | 8/1990 | Hirawa et al. ................. 364/520 |
| 5,155,805 | 10/1992 | Kaasila ........................... 395/151 |

FOREIGN PATENT DOCUMENTS
0200885A3 12/1986 European Pat. Off. .
0339648A2 11/1989 European Pat. Off. .

Primary Examiner—Phu K. Nguyen
Attorney, Agent, or Firm—Lowe, Price, LeBlanc & Becker

[57] ABSTRACT

For image parts in an image with large circumscribed quadrilaterals, one-dimensional data development is executed where intersection point data on a scanning line are accumulated for plural image parts and one-dimensional raster data of the scanning line is produced based on the intersection point data. For image parts with small circumscribed quadrilaterals, two-dimensional data development is executed where intersection point data in an image part are obtained and two-dimensional raster data of the image part is produced. While the one-dimensional data development requires only a small memory capacity for raster data creation even for relatively large image parts, the two-dimensional data development allows high-speed raster data creation for relatively small image parts.

20 Claims, 21 Drawing Sheets

Fig. 6A

WRITING FLAG TABLE WT1

|   | 0 | 1 | 2 | n-2 | n-1 | n |
|---|---|---|---|-----|-----|---|
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| 3 | 1 | 1 | 1 | 1 | 1 | 1 |
| 4 | 0 | 1 | 0 | 0 | 1 | 0 |
| 5 | 0 | 0 | 1 | 1 | 0 | 0 |
| 6 | 0 | 1 | 0 | 0 | 1 | 0 |
| m-1 | 0 | 0 | 0 | 0 | 0 | 0 |
| m | 0 | 0 | 0 | 0 | 0 | 0 |

Fig. 6B

BLACK-AND-WHITE COUNT TABLE CT1

| | 0 | 1 | 2 | n-2 | n-1 | n | |
|---|---|---|---|---|---|---|---|
| 0 | 0 | 0 | 0 | 0 | 0 | 0 | |
| 1 | 0 | 0 | 0 | 0 | 0 | 0 | |
| 2 | 0 | 0 | 0 | 0 | 0 | 0 | |
| 3 | 0 | +1 | +1 | +1 | +1 | 0 | C |
| 4 | 0 | -1 | 0 | 0 | -1 | 0 | C |
| 5 | 0 | 0 | 0 | 0 | 0 | 0 | |
| 6 | 0 | +1 | 0 | 0 | +1 | 0 | |
| m-1 | 0 | 0 | 0 | 0 | 0 | 0 | |
| m | 0 | 0 | 0 | 0 | 0 | 0 | |

Fig. 10A

LAYER DATA TABLE LT

| | CR | LA | MP | RP |
|---|---|---|---|---|
| L0 | 0 | 100% | 0 | 0 |
| L1 | 0 | PICTURE | 0 | 0 |
| L2 | 0 | 0% | 0 | 0 |
| L3 | 0 | 85% | 0 | 0 |
| L4 | 0 | 25% | 0 | 0 |
| L5 | 0 | 50% | 0 | 0 |

LAYER NUMBER

CR: BLACK-AND-WHITE COUNT REGISTER
LA: LAYER PROPERTY DATA
MP: FROM POINTER
RP: FORE POINTER

Fig. 11A

INTERSECTION POINT DATA TABLE
IT2

| | NL | FBW | MLP | RLP |
|---|---|---|---|---|
| A0 | — | — | — | — |
| A1 | — | — | — | — |
| A2 | — | — | — | — |

NL: LAYER NUMBER
FBW: BLACK-AND-WHITE FLAG
MLP: FROM LINK POINTER
RLP: FORE LINK POINTER

ADDRESS POINTER TEBLE
PT2

| NL | FBW | MLP | RLP |
|---|---|---|---|
| — | — | — | — |
| — | — | — | — |
| L0 | +1 | — | 0 |
| — | — | — | — |
| L0 | −1 | — | 0 |

WRITING FLAG TABLE
WT2

| Y | 0 | 2 | 4 | 6 | 8 | 10 | 12 | 14 | 16 | 18 | 20 | 22 | 24 | 26 | 28 | 30 |
|---|---|---|---|---|---|---|---|---|---|---|---|---|---|---|---|---|
| | 1 1 1 1 1 | 0 0 0 | 0 | F 1 | 0 0 0 0 | 0 0 0 0 | 0 0 0 0 | 0 0 0 0 | 0 0 | 1 | 1 1 1 1 1 | | | | | |

WRITING FLAG TABLE WT2

ADDRESS POINTER TABLE PT2

| NL | FBW | MLP | RLP |
|---|---|---|---|
| L3 | +1 | 0 | 0 |
| L3 | −1 | 0 | 0 |
| L0 | +1 | A1 | A0 |
| L1 | +1 | 0 | 0 |
| L3 | −1 | 0 | 0 |
| L2 | −1 | 0 | 0 |
| L5 | +1 | 0 | 0 |
| L1 | −1 | 0 | 0 |
| L0 | −1 | A2 | A2 |

INTERSECTION POINT DATA TABLE IT2

| | NL | FBW | MLP | RLP |
|---|---|---|---|---|
| A0 | L2 | +1 | Y9 | A1 |
| A1 | L3 | +1 | A0 | Y9 |
| A2 | L5 | −1 | Y24 | Y24 |

NL: LAYER NUMBER
FBW: BLACK-AND-WHITE FLAG
MLP: FROM LINK POINTER
RLP: FORE LINK POINTER

Fig. 1 2 A

Y=5
Lef=L3

LAYER DATA TABLE LT

|    | CR | LA      | MP | RP |
|----|----|---------|----|----|
| L0 | 0  | 100%    | 0  | 0  |
| L1 | 0  | PICTURE | 0  | 0  |
| L2 | 0  | 0%      | 0  | 0  |
| L3 | 1  | 85%     | 0  | 0  |
| L4 | 0  | 25%     | 0  | 0  |
| L5 | 0  | 50%     | 0  | 0  |

Fig. 1 2 B

Y=7
Lef=0

LT

|    | CR | LA      | MP | RP |
|----|----|---------|----|----|
| L0 | 0  | 100%    | 0  | 0  |
| L1 | 0  | PICTURE | 0  | 0  |
| L2 | 0  | 0%      | 0  | 0  |
| L3 | 0  | 85%     | 0  | 0  |
| L4 | 0  | 25%     | 0  | 0  |
| L5 | 0  | 50%     | 0  | 0  |

Fig. 12C

Y=9
Lef=L3

LT

| | CR | LA | MP | RP |
|---|---|---|---|---|
| L0 | 1 | 100% | L2 | 0 |
| L1 | 0 | PICTURE | 0 | 0 |
| L2 | 1 | 0% | L3 | L0 |
| L3 | 1 | 85% | 0 | L2 |
| L4 | 0 | 25% | 0 | 0 |
| L5 | 0 | 50% | 0 | 0 |

Fig. 12D

Y=10
Lef=L3

LT

| | CR | LA | MP | RP |
|---|---|---|---|---|
| L0 | 1 | 100% | L1 | 0 |
| L1 | 1 | PICTURE | L2 | L0 |
| L2 | 1 | 0% | L3 | L1 |
| L3 | 1 | 85% | 0 | L2 |
| L4 | 0 | 25% | 0 | 0 |
| L5 | 0 | 50% | 0 | 0 |

Fig. 12E

Y = 11
Lef = L2

LT

| | CR | LA | MP | RP |
|---|---|---|---|---|
| L0 | 1 | 100% | L1 | 0 |
| L1 | 1 | PICTURE | L2 | L0 |
| L2 | 1 | 0% | 0 | L1 |
| L3 | 0 | 85% | 0 | 0 |
| L4 | 0 | 25% | 0 | 0 |
| L5 | 0 | 50% | 0 | 0 |

Fig. 12F

Y = 16
Lef = L1

LT

| | CR | LA | MP | RP |
|---|---|---|---|---|
| L0 | 1 | 100% | L1 | 0 |
| L1 | 1 | PICTURE | 0 | L0 |
| L2 | 0 | 0% | 0 | 0 |
| L3 | 0 | 85% | 0 | 0 |
| L4 | 0 | 25% | 0 | 0 |
| L5 | 0 | 50% | 0 | 0 |

Fig. 12G

Y = 22
Lef = L5

LT

| | CR | LA | MP | RP |
|---|---|---|---|---|
| L0 | 1 | 100% | L1 | 0 |
| L1 | 1 | PICTURE | L5 | L0 |
| L2 | 0 | 0% | 0 | 0 |
| L3 | 0 | 85% | 0 | 0 |
| L4 | 0 | 25% | 0 | 0 |
| L5 | 1 | 50% | 0 | L1 |

Fig. 12H

Y = 23
Lef = L0

LT

| | CR | LA | MP | RP |
|---|---|---|---|---|
| L0 | 1 | 100% | L5 | 0 |
| L1 | 0 | PICTURE | 0 | 0 |
| L2 | 0 | 0% | 0 | 0 |
| L3 | 0 | 85% | 0 | 0 |
| L4 | 0 | 25% | 0 | 0 |
| L5 | 0 | 50% | 0 | L0 |

METHOD OF AND APPARATUS FOR PROCESSING IMAGE DATA

BACKGROUND OF THE INVENTION

1. Field of the Invention

The present invention relates to a method of and an apparatus for producing raster data of an image including plural image parts, based on information of intersection points of scanning lines with contours of image parts.

2. Description of the Prior Art

Several efficient methods have been known for creating image data such as raster data of an image including plural image parts; for example, those described in Japanese Patent Laying-Open Gazettes No. Sho-59-101969, No. Sho-61-212895, and No. Hei-1-225989.

In the method disclosed in the Japanese Patent No. Sho-59-101969, a contour vector (closed loop vector) is obtained for each image part contained in a one-page-image and decomposed to element vectors. Here, each element vector data consists of coordinates of a start point and an end point, and indicates whether an image region below the element vector is a filling region or a non-filling region. The element vectors are sorted and merged according to predetermined rules and rearranged. Intersection points of the rearranged vector with scanning lines are obtained, and image data or run-length data are then produced corresponding to the coordinates of the intersection points.

In this first method, since each figure is processed based on its contour vector, intersection data is not required for each pixel on a one-page-image; thus, a memory capacity sufficient for processing is rather small.

The method of the Japanese Patent Sho-59-101969 has been improved to make a method disclosed in the Japanese Patent Hei-1-225989 which does not require sorting in a scanning direction; thus processing of the latter is much faster than that of the former.

In the first method, determining of contour vectors for all figures in a one-page-image, decomposing of the contour vectors into element vectors, and sorting and merging of the element vectors require rather long processing time, especially when a one-page-image contains a large number of figures. This becomes more serious because a character such as 'A' or '1' is processed as a figure in this method. Provided that each character is defined by a hundred element vectors on average and a one-page-image contains two thousand characters, two hundred thousand vectors should be sorted and merged; this naturally requires a long processing time.

In the method disclosed in the Japanese Patent Sho-62-12895, information of intersection points of a figure contour with each scanning line is stored in a multi-digital memory for each pixel on a one-page-image. The intersection point information shows whether the intersection point is a filling start point or a filling end point on a scanning line. For example, when plural figure contours overlap one another at a particular pixel position and all the cross points thereon denote filling start points, the intersection point information at the pixel position is a positive multi-digital data indicating the number of overlaps. Image data or raster data are then produced on the basis of the intersection point information.

In this second method, since intersection point information is stored for each pixel on a one-page-image, additional processing is not required to determine intersection points of each contour vector with each scanning line in producing image data; thus processing of the second method is executed faster than the first method.

In the second method, improvement of the resolution of the one-page-image increases a memory capacity required for the multi-digital memory. For example, a one-page-image of 297×420 mm size with a resolution of 3000×3000 dpi needs a memory capacity of approximately 0.7 gigabyte.

SUMMARY OF THE INVENTION

An object of the invention is to provide a image data processing method and apparatus therefor for generating raster data of an image including plural image parts at a high speed.

The present invention is directed to an image data processing method and an apparatus therefor for producing raster data of an image comprising plural image parts, comprising the steps of:

sequentially selecting one of the plural image parts;

comparing the size of the selected image part with a predetermined reference size; and executing one-dimensional data processing for producing raster data representing a one-dimensional image portion of the selected image part when the image part is larger than the reference size, and executing two-dimensional data processing for producing raster data representing a two-dimensional image portion of the selected image part when the image part is smaller than the reference size.

According to an aspect of the present invention, the one dimensional data processing comprises the steps of:

(a-1) sequentially selecting one scanning line;

(a-2) finding at least one intersection point of the selected scanning line with a contour of an image region within the selected image part;

(a-3) producing filling-indication data indicating whether each intersection point is a start point or an end point of filling along the selected scanning line; and (a-4) producing raster data of the one-dimensional image portion on the selected scanning line on the basis of the filling-indication data and of image property data previously specified for each image part.

According to another aspect of the present invention, the two-dimensional data processing comprises the steps of:

(b-1) finding at least one intersection point of each scanning line with a contour of an image region within the selected image part;

(b-2) producing filling-indication data indicating whether each intersection point is a start point or an end point of filling along a scanning line; and (b-3) producing raster data of the two-dimensional image portion on the basis of the filling-indication data and of image property data previously specified for each image part.

Preferably, the image property data includes a halftone dot area rate and a screen ruling.

According to still another aspect of the present invention, the steps (a-2) and (a-3) are executed for a first set of plural image parts overlapping at least partly with each other before the step (a-4); and the step (a-4) further comprises the steps of:
(a-4-1) adding the filling indication data obtained for each image part of the first set of plural image parts with respect to each pixel on the selected scanning line to thereby obtain an added data for each pixel;
(a-4-2) accumulating the added data of each pixel along the selected scanning line to thereby obtain an accumulated data for each pixel; and
(a-4-3) comparing the accumulated data for each pixel with a prescribed reference value on the selected scanning line to thereby produce raster data representing the one-dimensional image portion on the selected scanning line, where the one-dimensional image portion is blank on and after a first type pixel whose accumulated data is equal to the reference value and is filled on and after a second type pixel whose accumulated data is different from the reference value.

According to another aspect of the invention, the steps (b-1) and (b-2) are executed for a second set of plural image parts overlapping at least partly with each other before the step (b-3); and
the step (b-3) further comprises the steps of:
(b-3-1) adding the filling indication data obtained for each image part of the second set of plural image parts with respect to each pixel on each scanning line to thereby obtain an added data for each pixel;
(b-3-2) accumulating the added data of each pixel along each scanning line to thereby obtain an accumulated data for each pixel; and
(b-3-3) comparing the accumulated data for each pixel with the reference value on each scanning line to thereby produce raster data representing the two-dimensional image portion of the second set of plural image parts, where the two-dimensional image portion is blank on and after the first type pixel along each scanning line and is filled on and after the second type pixel along each scanning line.

Preferably, the reference value includes all of the even numbers and zero.

According to another aspect of the present invention, the step (a-3) further comprises the step of:
setting a flag to each pixel where the filling indication data is produced; and
at the step (a-4-3), the raster data is produced such that the one-dimensional image portion is filled on and after a third type pixel whose accumulated data is equal to the reference value and to which the flag is set.

According to still another aspect of the invention, the step (b-2) further comprises the step of:
setting a flag to each pixel where the filling indication data is generated; and
at the step (b-3-3), the raster data is produced such that the two-dimensional image portion is filled on and after the third type pixel.

The present invention is also directed to an image data processing apparatus comprising:
first means for producing intersection point information representing an intersection point of each scanning line with a contour of an image region within an image part;
a memory for storing the intersection point information; and
second means for producing raster data on the basis of the intersection point information stored in the memory;

wherein the first means comprises:
means for sequentially selecting one of the plural image parts;
means for comparing the size of the selected image part with a predetermined reference size; and
means for producing one-dimensional intersection point information when the selected image part is larger than the reference size and producing two-dimensional intersection point information when the selected image part is smaller than the reference size, wherein the intersection point information includes filling-indication data indicating whether each intersection point of each scanning line with a contour of an image region within the selected image part is a start point or an end point of filling.

According to an aspect of the invention, the memory includes two memory units; and
the apparatus further comprises a first switch and a second switch for connecting the first and second means alternately and complementarily to the two memory units such that the first means writes the intersection point information in one of the two memory units while the second means reads out the intersection information from the other of the two memory units to produce the raster data.

In one-dimensional data processing, one-dimensional raster data on each scanning line are created based on intersection points and filling indication data for the selected scanning line. Hence, even when an image part is large, a relatively small memory capacity is sufficient for storing data of intersection points. In two-dimensional data processing, two-dimensional raster data in each image part are created at a high speed based on intersection points and filling indication data within the image part.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are explanatory views showing intersection point information for the image part of FIG. 4 obtained by the data development;

FIG. 10A is an explanatory view showing a layer data table cleared;

FIGS. 11A through 11C are explanatory views showing intersection point information obtained by the data development for large image parts;

FIGS. 12A through 12H are explanatory views showing change of the layer data table of FIG. 10A during one-dimensional data development.

DESCRIPTION OF THE REFERRED EMBODIMENT

A. Structure of Apparatus

Figure 1:
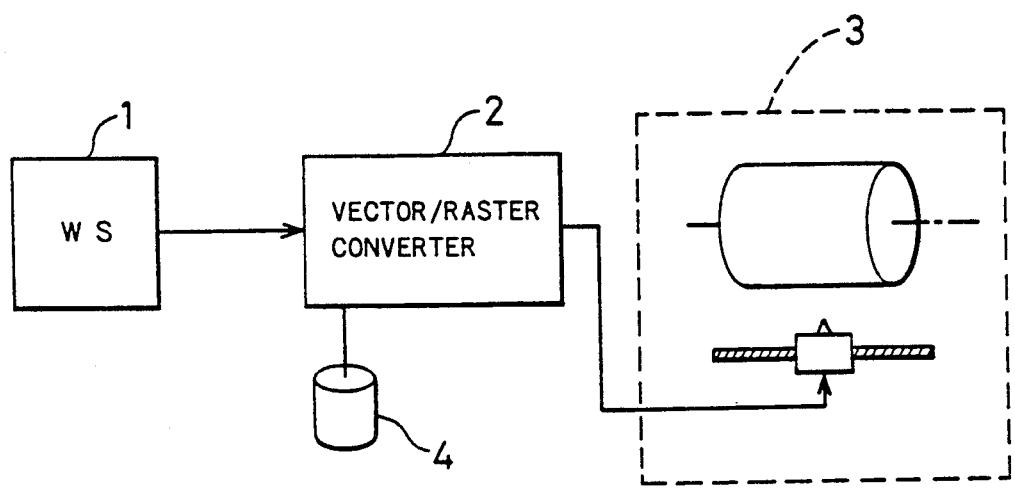
FIG. 1 is a block diagram illustrating the structure of an image data processing apparatus embodying the invention.

FIG. 1 is a block diagram illustrating the structure of an image data processing apparatus embodying the invention. The image data processing apparatus includes a workstation 1, a vector/raster converter 2, and an image memory unit 3. A character font disk 4 for storing vector data of character fonts is connected to the vector/raster converter 2.

An operator edits a one-page-image (or total image) including characters, figures and pictures on the workstation 1. The workstation 1 converts the edited image into a program written in a page description language or PDL and outputs the program. The PDL includes, for example, 'Postscript', 'Interpress' and 'DDL'. Programs written in the page description language are hereinafter referred to as PDL programs.

Figure 2:
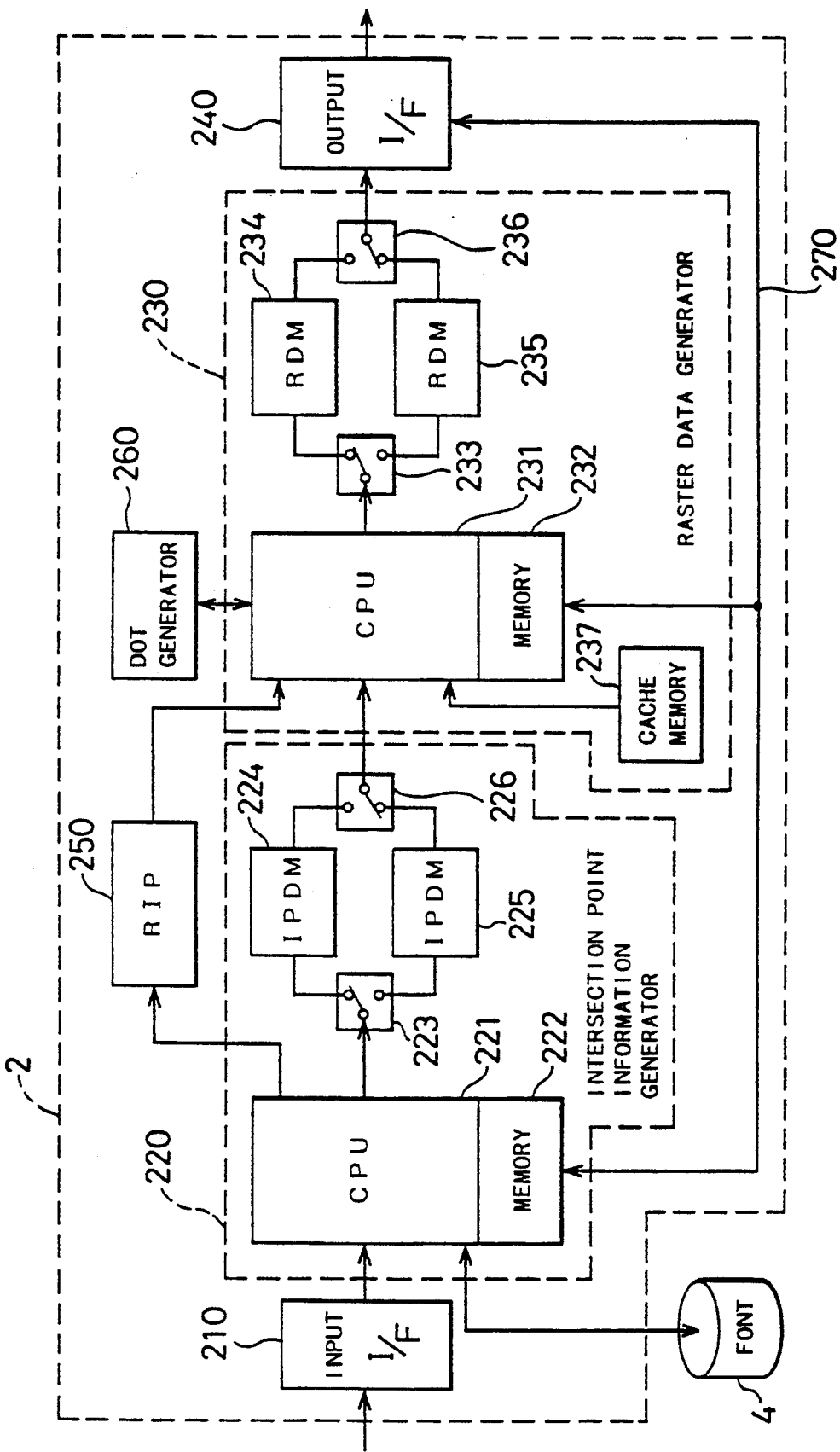
FIG. 2 is a block diagram illustrating the vector/raster converter.

FIG. 2 is a block diagram illustrating the vector/raster converter 2 which produces raster data based on a PDL program. The vector/raster data converter 2 includes an input interface 210 for receiving a PDL program, and an intersection point information generator 220, defined by a broken line, for decoding the PDL program and creating information on an intersection point of a scanning line with a contour vector of a figure in an image (hereinafter referred to as intersection point information). The converter 2 further includes a raster data generator 230, defined by a broken line, for producing raster data on the basis of the intersection point information, and an output interface 240 for outputting the raster data.

The generator 220 includes a first CPU 221, a memory 222 connected to the first CPU 221, two switches 223 and 226, and two intersection point data memories 224 and 225 disposed in alignment between the switches 223 and 226. One of the two memories 224 and 225 is selected by the switch 223, and the other by the switch 226. Intersection point data, or intersection point information, output from the first CPU 221 are stored in one of the memories 224 or 225 selected by the switch 223, and at the same time, the intersection point data previously stored are read out from the other memory by the raster data generator 230. Alternate switching of the two memories 224 and 225 thus enables simultaneous writing and reading of intersection point data and improves processing speed. Incidentally, the first CPU 221 is connected to the character font disk 4.

The raster data generator 230 includes a second central CPU 231, a memory 232 connected to the second CPU 231, two switches 233 and 236, and two raster data memories 234 and 235 disposed in alignment between the switches 233 and 236. A character cache memory 237 is connected to the second CPU 231. One of the two raster data memories 234 and 235 is selected by the switch 233, and the other by the switch 236. Raster data output from the second CPU 231 are stored in one of the raster memories 234 or 235 selected by the switch 233, and at the same time, the raster data previously stored are read out from the other raster memory.

The converter 2 further includes a raster image processor 250 disposed between the first CPU 221 and the second CPU 231 for performing tone change or color computation of picture images, and a dot generator 260 connected to the second CPU 231 for generating halftone dot image data of pictures.

B. Image Processing

B-1: Target Image of Processing

Figure 3:
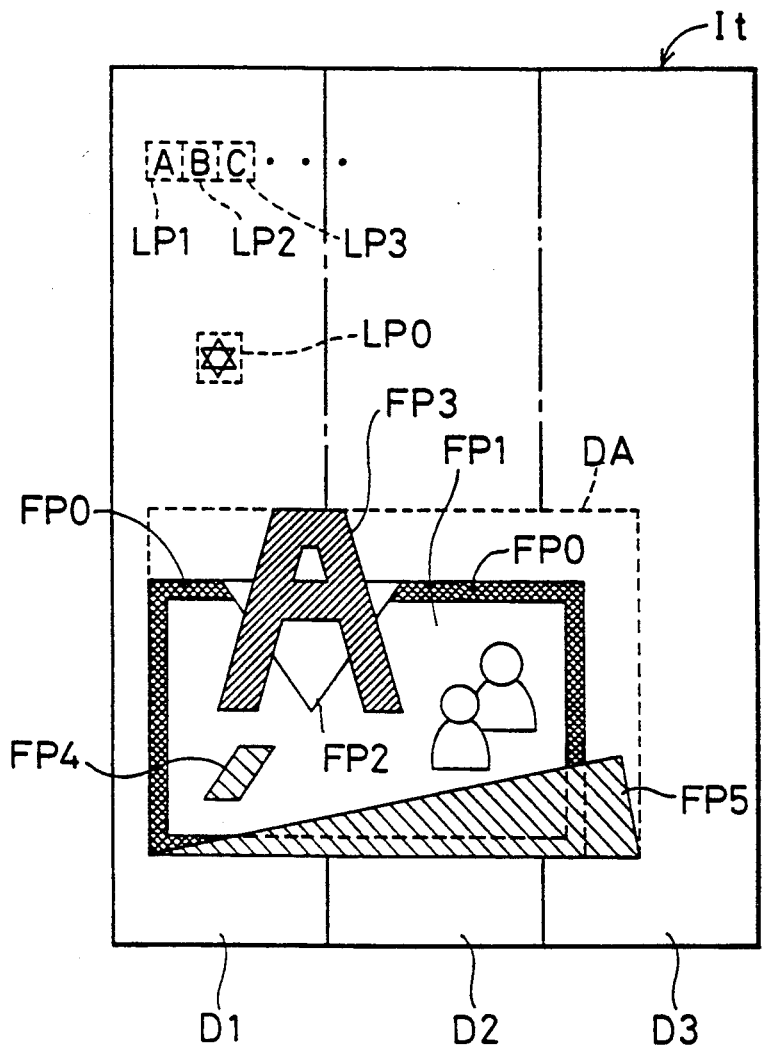
FIG. 3 is a plan view showing an image processed in the embodiment.

FIG. 3 is a plan view showing a total image It to be processed in the embodiment. The total image It includes relatively small image parts LP0 through LP3 and relatively large image parts FP0 and FP5. The image part LP0 includes a figure, and each of the image parts LP1 through LP3 include a character. The image part FP1 includes a picture, and each of the other large image parts FP0 and FP2 through FP5 includes a figure of uniform color and uniform concentration.

Each image part is surrounded by a circumscribed rectangle of each character or figure, and an image in the rectangular region is separately processed as a unit. In FIG. 3, circumscribed rectangles of the small image parts LP0 through LP3 are drawn in broken line.

The small image parts LP0 through LP3 and the large image parts FP0 through FP5 have increasing priority in this order. Processing of the image parts described later is executed in the increasing order of priority. In the example of FIG. 3, the large image parts FP0 through FP5 overlap one another in such a manner that part of the image parts of lower priority are covered with those of higher priority.

In the embodiment, generation of the intersection point information for the small image parts LP0 through LP3 is executed by a different different method from that for the large image parts FP0 through FP5. For the small image parts, two-dimensional information of intersection points in each image part is generated; for the large image parts, one-dimensional information of intersection points on each scanning line is generated. Such separate processing saves the memory capacity of the intersection point data memories 224 and 225 and shortens the total processing time.

The total image It of the embodiment is divided into three image regions D1 through D3 as shown in FIG. 3. The division of the image facilitates to find an intersection point of each scanning line with a contour of each image part and to generate the intersection point information. While image processing for the overall image It requires large capacity of the memories 224 and 225, each of the divided image regions D1 through D3 needs far smaller capacity of the memories. Each image region D1, D2 or D3 is hereinafter referred to as an output band.

Generating intersection point information for the small image parts and the same for the larger image parts are successively described below. Then processing about the total image It is explained. The generation of the intersection point information is hereinafter referred to as "data development".

B-2: Processing for Small Image Parts

Figure 4:
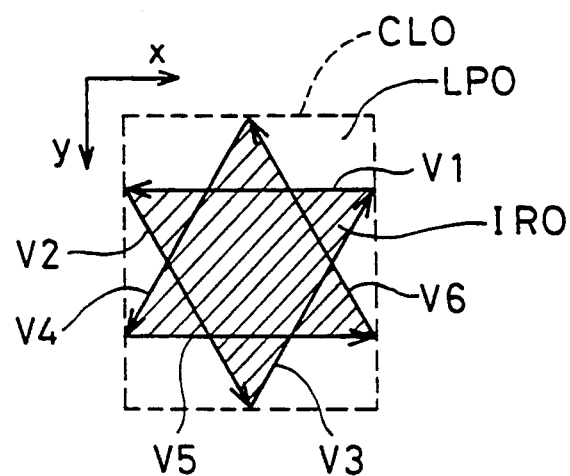
FIG. 4 is an enlarged view showing one image part.

FIG. 4 is an enlarged view showing the image part LP0, which is surrounded by circumscribed rectangle CL0 and includes an image region IR0 of a uniform dot percent (or uniform halftone dot area rate). The image region IR0 is defined by six vectors V1 through V6.

Figure 5:
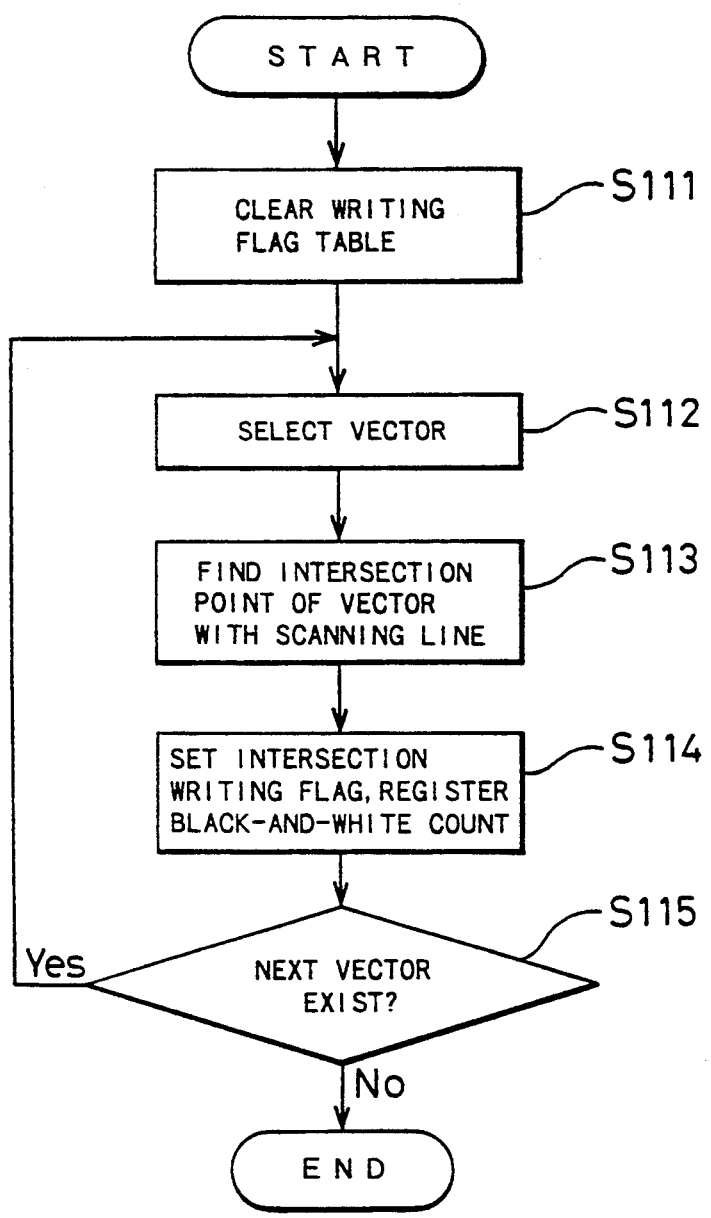
FIG. 5 is a flowchart showing data development for small image parts.

FIG. 5 is a flowchart showing data development for small image parts executed by the first CPU 221.

FIGS. 6A and 6B are explanatory views showing intersection point information for the image part LP0 obtained by the data development. The intersection point information for the small image part includes a writing flag table WT1 of FIG. 6A, and a black-and-white count table CT1 of FIG. 6B. Data in the tables WT1 and CT1 for one image part are stored together in either of the two intersection point data memories 224 and 225.

At step S111 of FIG. 5, the writing flag table WT1 and the black-and-white count table CT1 are cleared.

At step S112, one of the vectors V1 through V6 within the target image part LP0 is successively picked up.

The program then proceeds to step S113 at which intersection points of the selected vector with each scanning line in a main scanning direction y are determined. For example, the vector V1 has intersection points aligned in parallel with a subscanning direction x at a main scanning coordinate y of three.

At step S114, a value 'one' is substituted into an intersection point writing flag F at each intersection point in the writing flag table WT1. The flag F shows the location of intersection points of contour vectors with scanning lines. For example, the vector V1 has the flag F of the value 'one' in parallel with the subscanning direction x at the main scanning coordinate y of three as shown in FIG. 6A.

At the same step S114, black-and-white counts C are registered in the black-and-white count table CT1 at the same coordinates as those of the flag F.

The value of the black-and-white count C corresponds to the filling indication data of the invention for small image parts.

The value of the black-and-white count C is determined as follows: The values of the writing flag F are checked in the main scanning direction y at each subscanning coordinate x, and the value '+1' is substituted into the black-and-white count C at the coordinates which are start points of filling. On the other hand, the black-and-white count C is set at '−1' at the coordinates which are end points of filling. Pixels between +1 and −1 in the count C are filled, for example, in black and the other pixels in white. The method for determining the value of the black-and-white count C based on vector data is shown in Japanese Patent Laying-Open Gazette No. Sho-59-101969 at page 5, the disclosure of which is hereby incorporated by reference.

When generation of the intersection point information is completed at step S114, the program proceeds to step S115 at which it is determined whether a next vector exists. When the answer is YES at step S115, the program returns to step S112 at which the same processing starts for the next vector.

Steps S112 through S115 are repeatedly executed to process plural vectors. When plural intersections are located at the same coordinate point, for example, (2,5), the value of the flag F for the point remains as one. On the other hand, the black-and-white counts C for the plural intersections are accumulated in the black-and-white count table CT1.

The black-and-white count C accumulated at each pixel, or each coordinate point, corresponds to the added data of the invention.

Since the vector V2 with the black-and-white count C of '−1' and the vector V4 with the count C of '+1' are located at the same coordinate point (2,5), the black-and-white count C at the point is equal to zero as shown in FIG. 6B. A coordinate point (0,3) which has a value 'one' in the writing flag F and a value 'zero' in the black-and-white count C is filled in later processing.

Provided that the maximum value of coordinates in both of the main scanning and subscanning directions on the tables WT1 and CT1 are 1024, and the depth of the table CT1 is eight bit, the required capacities of the memories 224 and 225 are respectively 1.125 megabyte. When the size of the circumscribed rectangle of the image part is smaller than the maximum coordinates or 1024×1024, only part of the memory 224 or 225 which has the capacity of 1.125 megabyte is used. In such a case, the range of coordinates used in the memory 224 or 225 is stored therein.

Upon completion of the data development to obtain the intersection point information of an image part, the second CPU 231 reads the intersection point information out of the memory 224 or 225 and produce raster data according to the following procedure.

Firstly the writing flags F for each scanning line are successively read out by the second CPU 231 from the writing flag table WT1 stored in the memory 224 or 225. When one coordinate point whose flag F is one is found, the black-and-white counts C for the following coordinate points are accumulated thereafter. The accumulated value ΣC of the black-and-white count C corresponds to the accumulated data of the invention.

Image data or raster data are produced based on the accumuated value ΣC according to the following rules, and are stored in the raster data memory 234 or 235.

Figure 7A:
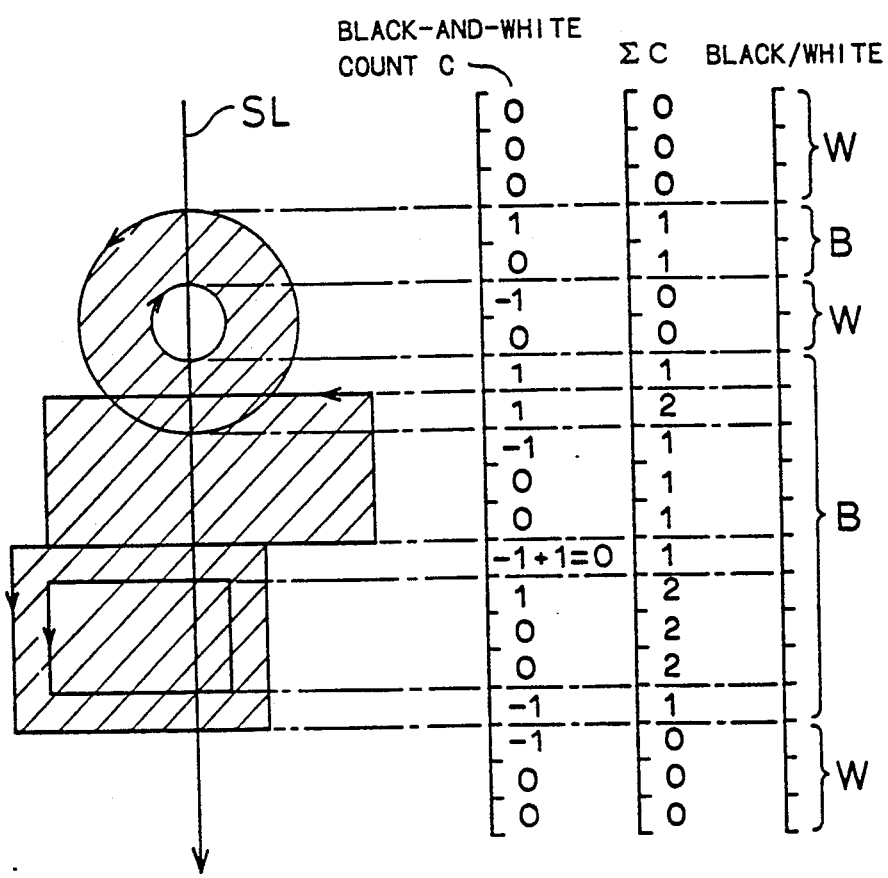
FIGS. 7A and 7B are explanatory views showing rules for determining image data based on the accumulated value of the intersection point information.
Figure 7B:
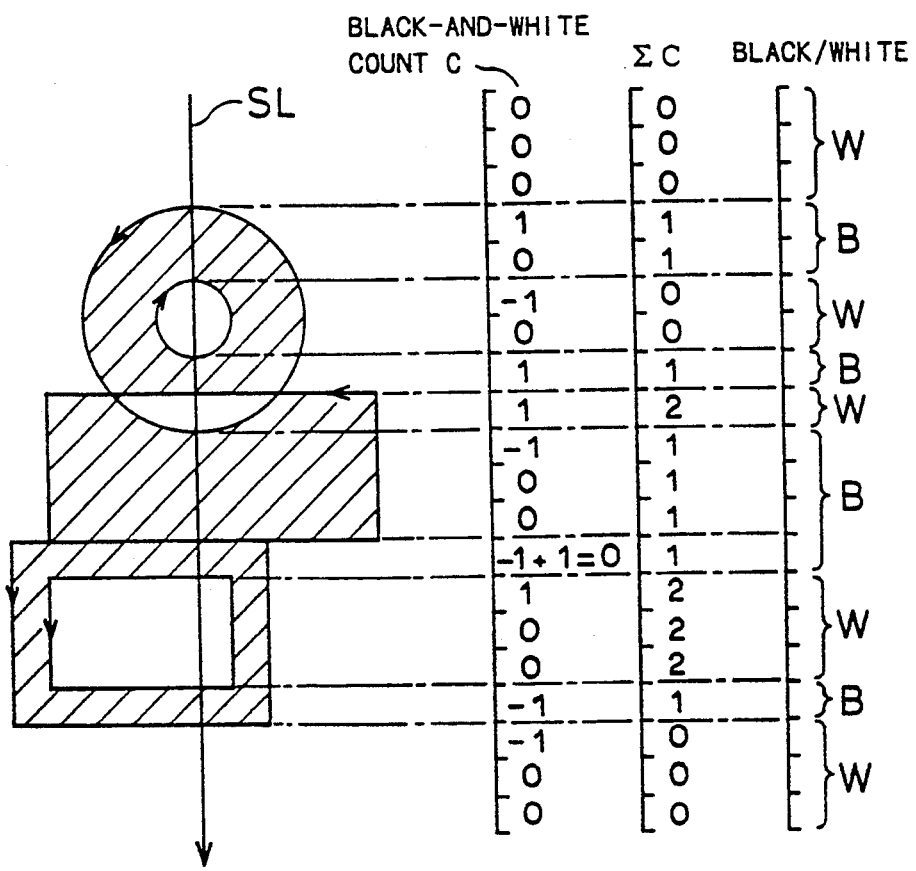

FIGS. 7A and 7B schematically illustrate the rules for producing image data based on the accumulated value ΣC.

The first rule shown in FIG. 7A is generally referred to as non-zero loading rule. The values of the white-and-black count C are accumulated on each scanning line SL. The pixels which have the accumulated value ΣC of one or greater are filled, for example, in black, while the pixels which have the value ΣC of zero or less are not filled, for example, to remain white.

The rule shown in FIG. 7B is generally referred to as odd-even rule. The values of the white-and-black count C are also accumulated on each scanning line SL. The pixels which have the accumulated value ΣC of an odd number are filled, for example, in black, while the pixels which have the value ΣC of an even number are not filled, for example, to remain white.

Properties of each image part including halftone dot % (or halftone dot area rate), dot shape (or dot type), dot density (or screen ruling) are specified based on the PDL program. The dot generator 260 executes screening of the image part based on the properties so as to fill inside of a contour and create raster data representing the image part. The properties may specify colors other than black-and-white.

The raster data thus created are written in the raster data memory 234 or 235 selected by the switch 223.

As described above, raster data for the small image parts are created based on two-dimensional intersection point information including the writing flag table WT1 and the black-and-white count table CT1. Accordingly, no sorting or merging of vectors is required for raster data creation, thereby allowing high speed data processing.

B-3: Processing for Large image parts

For the large image parts, on the other hand, one-dimensional processing is executed. Data development is executed successively for plural large image parts on a single scanning line to create raster data for the scanning line. Here 'to be executed successively' means that no data development for small image parts is intermittently executed. In the embodiment, the large image parts FP0 through FP5 are processed successively to produce the intersection information for these image parts in the following manner.

Figure 8:
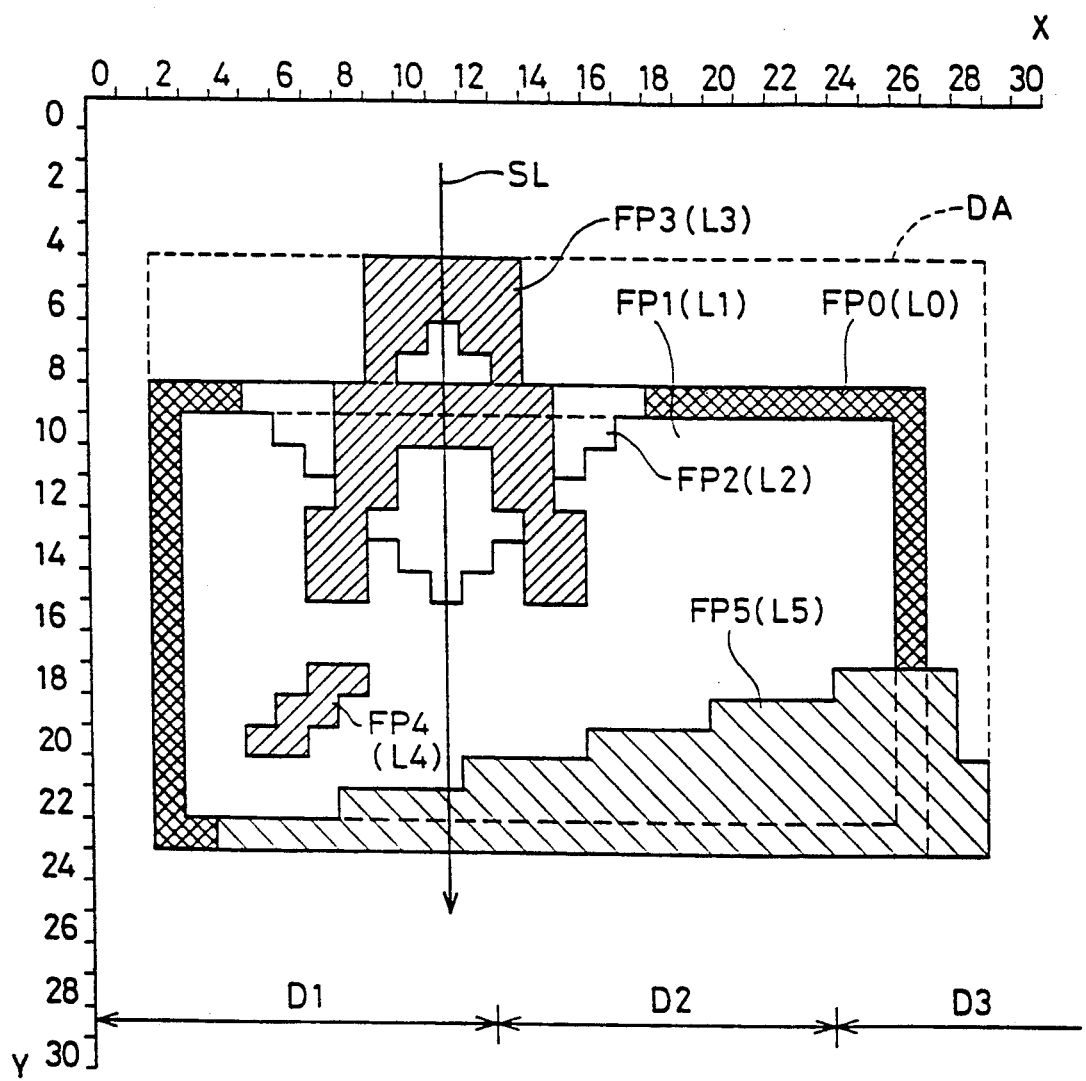
FIG. 8 is an enlarged view showing a development area including large image parts.

FIG. 8 is an enlarged view of a development area DA, shown in FIG. 3, including the large image parts FP0 through FP5. The ordinate and the abscissa are respectively a coordinate axis of the main scanning direction Y and that of the subscanning direction X. The location of each image part in the main scanning direction Y is set closer to the origin of the coordinates axes than the location shown in FIG. 3 for simplicity. Each image part is assumed to consist of a relatively small number of pixels and the border of each pixel is shown stepwise in FIG. 8. Actually a large image part consists of a greater number of pixels.

Figure 9:
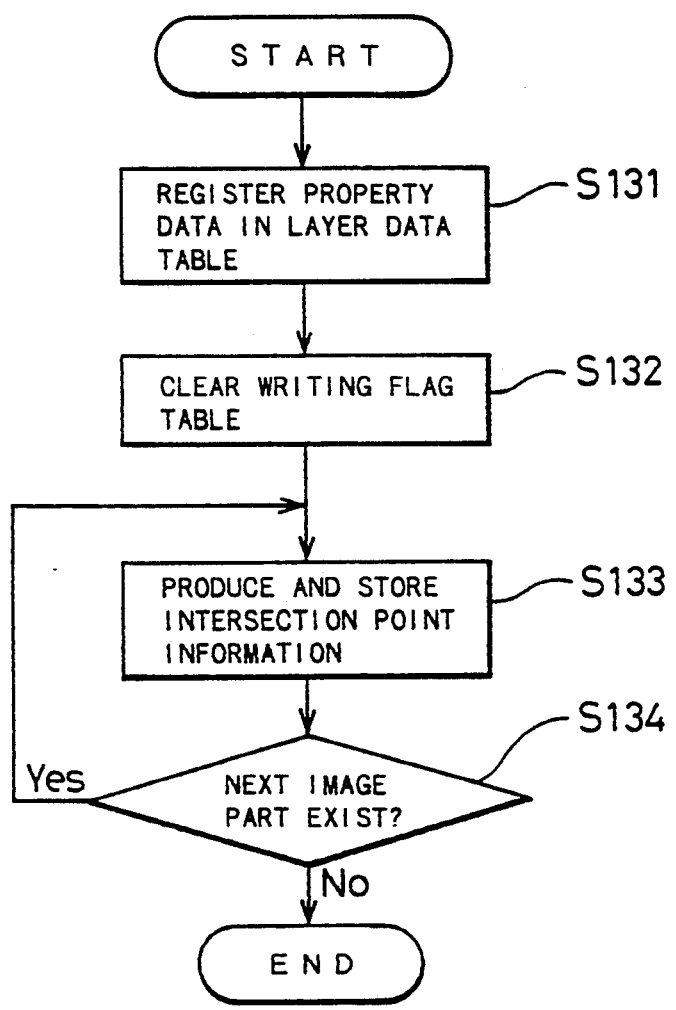
FIG. 9 is a flowchart showing data development for large image parts.

FIG. 9 is a flowchart showing the procedure of data development for the large image parts executed by the first CPU 221.

At step S131, property data of the large image parts FP0 through FP5 to be processed successively are stored in a layer data table LT in the intersection data memory 224 or 225 selected by the switch 223. Here, the property data include, for example, halftone dot % of a figure in the image part, a dot shape (or dot type), and a dot density (or screen ruling). The property data for the image part which includes a picture is information indicating existence of a picture.

FIG. 10A is an explanatory view showing the layer data table LT, in which property data of each image part are stored at step S131. Layers L0 through L5 are respectively assigned to the image parts FP0 through FP5. Halftone dot % of the figures in the image parts FP0 and FP2 through FP5 are respectively stored as property data of the layers L0 and L2 through L5, and information indicating existence of a picture is stored as property data of the layer L1. The other data in the table LT, that is, a black-and-white count register CR, a from-pointer MP, and an fore-pointer RP, which are described later, are cleared to zero.

Figure 10B:
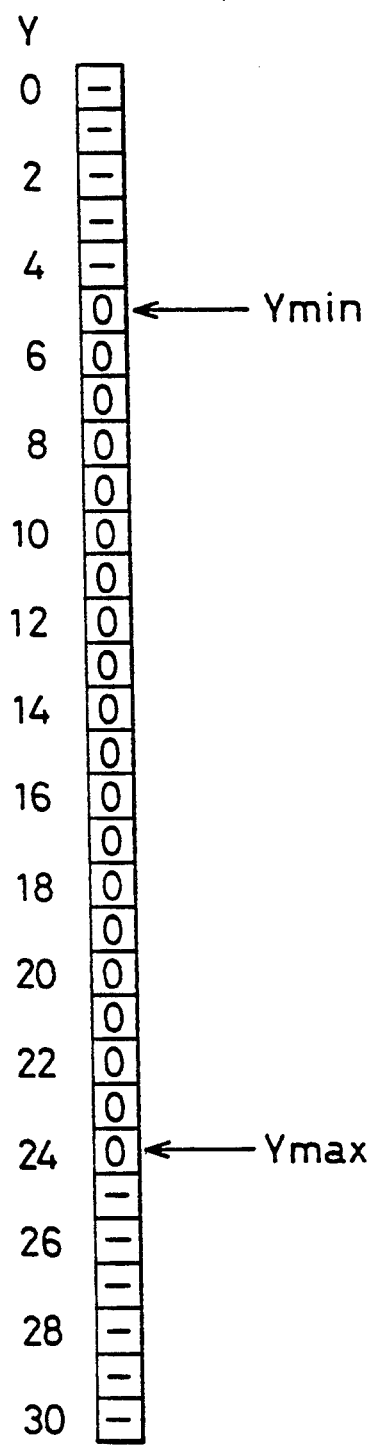
FIG. 10B is an explanatory view showing a writing flag table cleared.

At step S132, a writing flag table WT2 in the intersection data memory 224 or 225 is cleared. FIG. 10B is an explanatory view showing the cleared writing flag table WT2. As shown in FIG. 10B, an effective data area corresponding to the development area DA of FIG. 8 are cleared to zero in the writing flag table WT2, and the maximum coordinate value Ymax and the minimum coordinate value Ymin of the data area are respectively stored in a maximum coordinate register and a minimum coordinate register (not shown). The writing flag table WT2 may have any value at that coordinate position other than the effective data area which has a symbol '—'.

The program then proceeds to step S133 at which intersection point information for the first image part FP0 is created on a specified scanning direction and stored in the intersection point memory 224 or 225. FIG. 11A shows intersection point information on the scanning line SL of FIG. 8 obtained for the image part FP0.

The intersection point information for a large image parts consists of the writing flag table WT2, an intersection data address pointer table PT2 (hereinafter referred to as address pointer table), and an intersection data table IT2. The tables WT2, PT2, and IT2 are stored together in either of the two intersection data memories 224 and 225.

The image part FP0 is a rectangle of 100 halftone dot % or a solid rectangle. The solid rectangle extends from a value 9 to a value 23 in the main scanning direction Y on the scanning line SL. Intersection points of the scanning line SL with the contour of the image part FP0 are then calculated to exist at the positions of Y=9 and Y=24, and writing flags F at the positions of Y=9 and Y=24 are changed to one in the writing flag table WT2. At the same time, a layer number NL (=L0) is registered at the position of Y=9 in the address pointer table PT2, and a black-and-white flag FBW is changed to '+1' indicative of being filled or black. The black-and-white flag FBW is defined in the same manner as the black-and-white count C for the small image parts.

The black-and-white flag FBW corresponds to the drawing judgement data of the invention in the data development for the large image parts.

Meanwhile, the layer number NL (=L0) is registered at the position of Y=24 in the address pointer table PT2, and the black-and-white flag FBW is changed to '−1' indicative of being non-filled or white. The values of a from link pointer MLP and a fore link pointer RLP are equal to zero. Function of the link pointers MLP and RLP will be explained later.

The method for associating the writing flag table WT2 with the address pointer table PT2 is shown in Japanese Patent Laying-Open Gazette No. Hei-1-225989, the disclosure of which is hereby incorporated by reference.

The intersection data table IT2 represents the relation of plural layers overlapping one another, and no data are stored until the data development of the first large image part FP0 is completed.

After the intersection point information of the first image part FP0 is obtained for the scanning line SL, the program proceeds to step S134 at which the next image part FP1 is selected. The program then returns to step S133 at which the data development for the image part FP1 is executed on the same scanning line SL. For the image part FP1, the writing flags F, the layer number NL (=L1) in the address pointer table PT2, and the black-and-white flags FBW are set at the positions of Y=10 and Y=23. The next image part FP2 is selected at step S134 and the program returns to step S133.

Figure 11B:
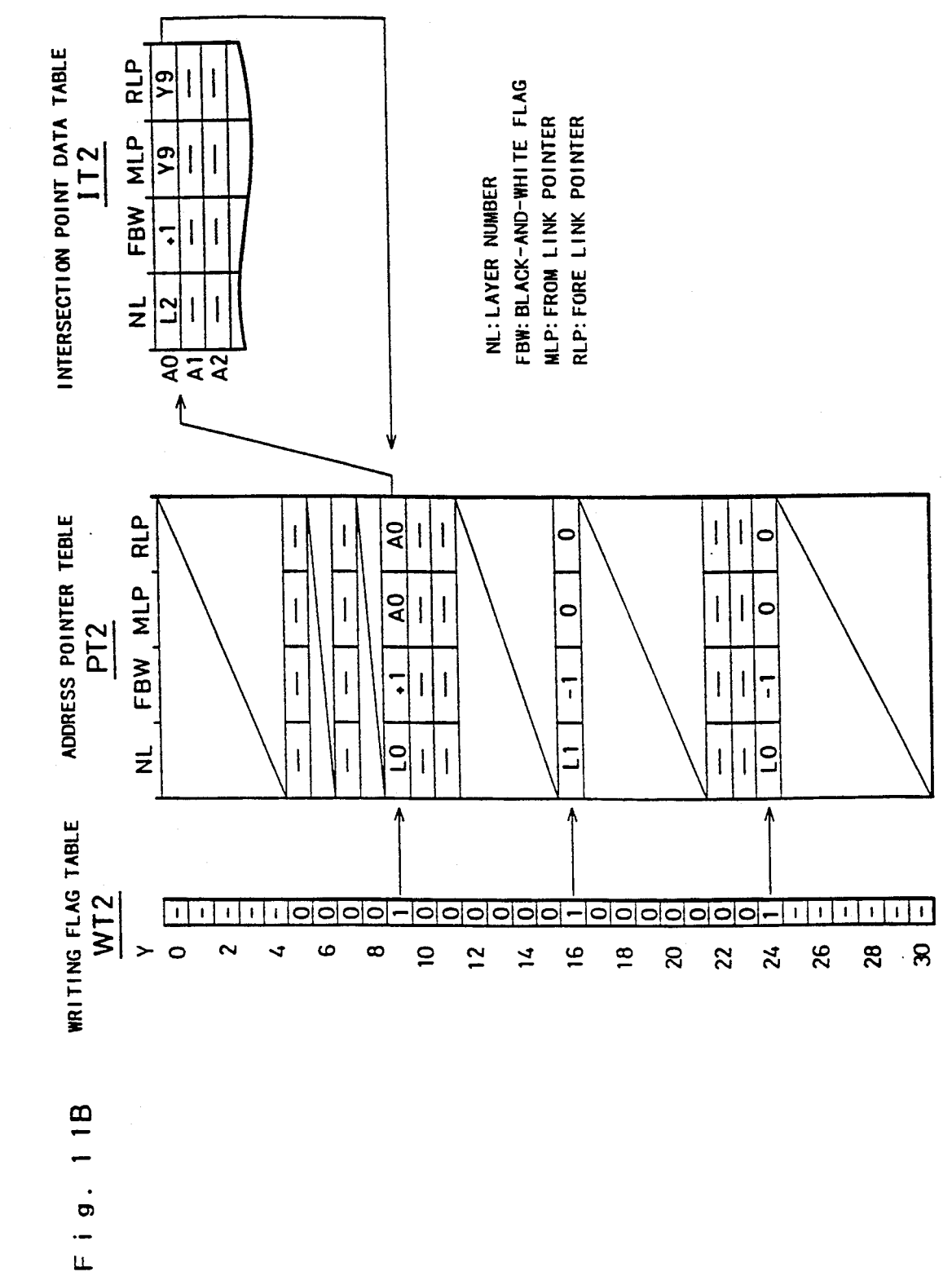

FIG. 11B is an explanatory view showing the intersection point information after completion of the data development for the image parts FP0 through FP2. The image part FP2 has a halftone dot % of zero, indicating blank, between a value 9 and a value 6 in the main scanning direction Y on the scanning line SL. Intersection points of the image part FP2 with the scanning line SL are located at Y=9 and Y=16.

As described above, one intersection point of the first image part FP0 also exists at the position of Y=9, and the intersection point information for the image part FP0, or the layer L0, is registered in the address pointer table PT2. Accordingly the intersection table information at Y=9 for the image part FP2 (layer number NL =L2, and the black-and-white flag FBW=+1) is written in an address A0 in the intersection point data table IT2 instead of writing the information in the table PT2.

At the same time, the value of the address A0 of the table IT2 is written in the from link pointer MLP and the fore link pointer RLP in the address pointer table PT2.

The from link pointer RLP in the table PT2 represents an address in the table IT2 for the layer which is located immediately above the current layer (in this case, L0) and which is related to the intersection point where the link pointer RLP exists. The fore link pointer FLP in the table PT2 represents an address in the table IT2 for the uppermost layer which is related to the intersection point where the link pointer FLP exists.

At a time point when the data development of the image part FP2 is completed, the image part FP2 is laid over the image part FP0 at the position of Y=9. The address A0 is registered both in the link pointers MLP and RLP on the address pointer table PT2 as seen in FIG. 11B consequently.

At the same time, data representing the position of Y=9 are written in the link pointers MLP and RLP at the address A0 on the intersection point data table IT2. The from link pointer MLP in the table IT2 represents a location at which the intersection point data is registered for the layer immediately below the current layer. The fore link pointer RLP in the table IT2 represents a location at which the intersection point data is registered for the layer immediately above the current layer. However, the link pointer RLP for the uppermost layer, such as that for the layer L2 at the address A0 at the position of Y=9, indicates the location of the lowest layer L0. The plural pieces of intersection point information for one intersection point, which are registered in the tables PT2 and IT2, are thus linked to each other through the link pointers MLP and RLP.

The intersection point information shown in FIG. 11C is obtained after completion of the data development for the large image parts FP0 through FP5 by repeating steps S133 and S134 of FIG. 9. In FIG. 11C, the linkage of the intersection point information at the position of Y=9 is shows by arrows. At the intersection point of Y=9, the lowest layer is the layer L0 which defines the intersection point as a start point of filling by the black-and-white flag FBW of +1; the second lowest layer is the layer L2 which also defines the intersection point as a start point of filling, and which is registered at the address A0 on the table IT2; and the uppermost layer is the layer L3 which defines the intersection point as a start point of filling, and which is registered at the address A1. The linkage shown in the writing flag table WT2, the address pointer table PT2, and the intersection point data table IT2 of FIG. 11C coincides with overlap of the image parts shown in FIG. 8.

On completion of producing the intersection point information for one scanning line, raster data for the scanning line is created and stored in the raster data memory 234 or 235. The raster data is created based on the writing flag table WT2, the address pointer table PT2, and the intersection point data table IT2 of FIG. 11C as well as the layer data table LT of FIG. 10A.

FIGS. 12A through 12H are explanatory views showing change of the layer data table LT during the creation of raster data on the scanning line SL.

On the scanning line SL, the position of Y=5 is firstly found to have the writing flag F of one on the table WT2, and accordingly the second CPU 231 reads out the content of the address pointer table PT2 at that position. According to the address pointer table PT2 of FIG. 11C, the layer L3 indicates a start point of filling at the position of Y=5 by the black-and-white flag FBW of +1, and no layer exists immediately below and above the layer L3. A value 'one' is thus written at the position of Y=5 in the scanning black-and-white count register CR for the layer 3 on the layer data table LT, as shown in FIG. 12A. The value shows that there exists a filling region of the layer L3 starting at the Y coordinate 5. Raster data for coordinates after Y=5 are created based on the condition (85 halftone dot %) specified by the layer property data in the layer data table LT.

Meanwhile, data representing the layer L3 is stored in an effective layer register Lef which indicates the highest layer at a certain Y coordinate. The effective layer register Lef and the layer data table LT are set in the memory 232 connected to the second CPU 231.

The information indicative of an end point of filling of the layer L3, that is, the black-and-white flag FBW of −1, is then found to be registered at the position of Y=7 on the address pointer table PT2. The value of the black-and-white flag FBW is added to the value of the scanning count register CR of the layer L3 to make the result of zero as seen in FIG. 12B. Raster data representing a blank is created for coordinates on and after Y=7.

Then at the position of Y=9, the values of the black-and-white flag FBW stored in the tables PT2 and IT2 are added to the corresponding values of the scanning count register CR for respective layers. The values of the scanning count register CR for the layers L0, L2, and L3 are thus set at one as shown in FIG. 12C. The order of linkage registered in the tables PT2 and IT2 is stored in an effective layer from pointer MP and an effective layer fore pointer RP in the layer data table LT. The effective link pointers MP and RP respectively represent a layer immediately above and below the current layer. The layers L0, L2 and L3 overlap one another in this order at the position of Y=9 as shown in FIG. 12C. Since the layer L3 is the highest, data representing the layer L3 is stored in the effective layer register Lef.

Where plural layers are overlapped, raster data for the highest layer is created at the position.

The layer L1 is further added at the position of Y=10 and the layer data table LT shown in FIG. 12D is obtained. The address pointer table PT2 has the intersection point information only for the layer L1 at the position of Y=10 However, since the information of the effective layer is registered in the layer data table LT of FIG. 12C, the effective layer at the position of Y=10 is readily determined only by referring to the table LT.

At the position of Y=11, the address pointer table PT2 indicates an end point of filling of the layer L3 by the black-and-white flag FBW of −1. The value '−1' is accordingly added to the scanning counter register CR of the layer L3, which becomes zero as shown in FIG. 12E. Here, the layer L3 is out of the linkage. The layer L2 becomes the highest for coordinates on and after Y=11 and raster data of the layer L2 is to be created accordingly.

As in the case at the position of Y=11, even when only the black-and-white flag FBW is registered in the address pointer table PT2 while the link pointers are not registered at the position, the effective layer at the position is readily determined by renewing the layer data table LT.

The scanning count register CR for the ineffective layers is not searched in vain because the linkage of effective layers is found by the pointers MP and RP.

The structure of the effective layer is thus easily determined.

FIGS. 12F, 12G, and 12H are explanatory views showing the content of the layer data table LT at the positions of Y=16, Y=22, and Y=23, respectively. At the end point (Y=24) of the development area DA, all data in the layer data table LT become zero and the creation of raster data on the scanning line is completed.

As described above, the large image parts are successively processed to make the one-dimensional intersection point information, and raster data for those image parts are created based on the one-dimensional information. Even when plural image parts overlap one another, raster data is produced not about all the image parts but only about the uppermost image part at each position, thus allowing high-speed processing.

B-4: Overall Procedure

Figure 13A:
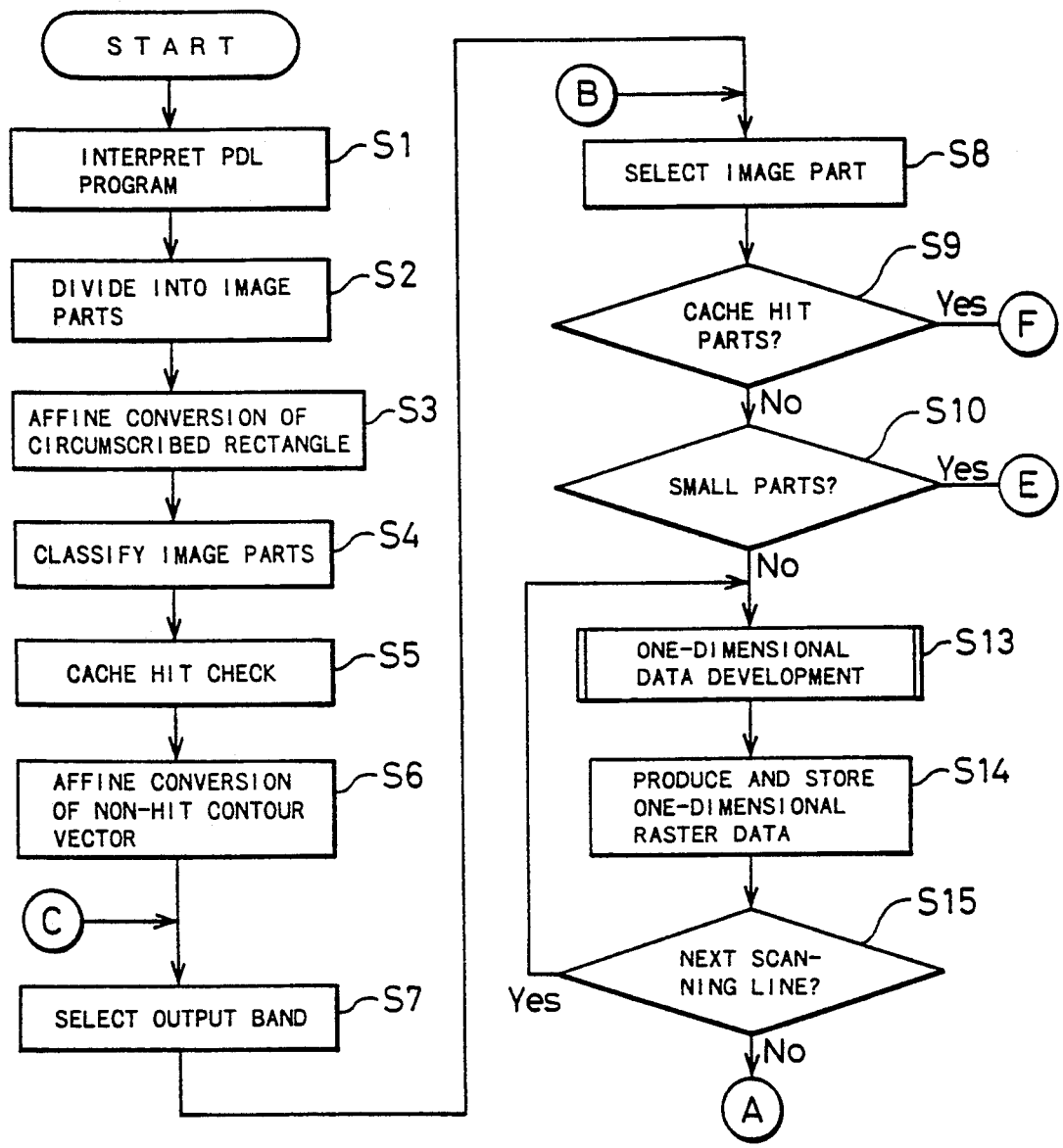
FIGS. 13A and 13B are flowcharts showing processing of the total image.
Figure 13B:
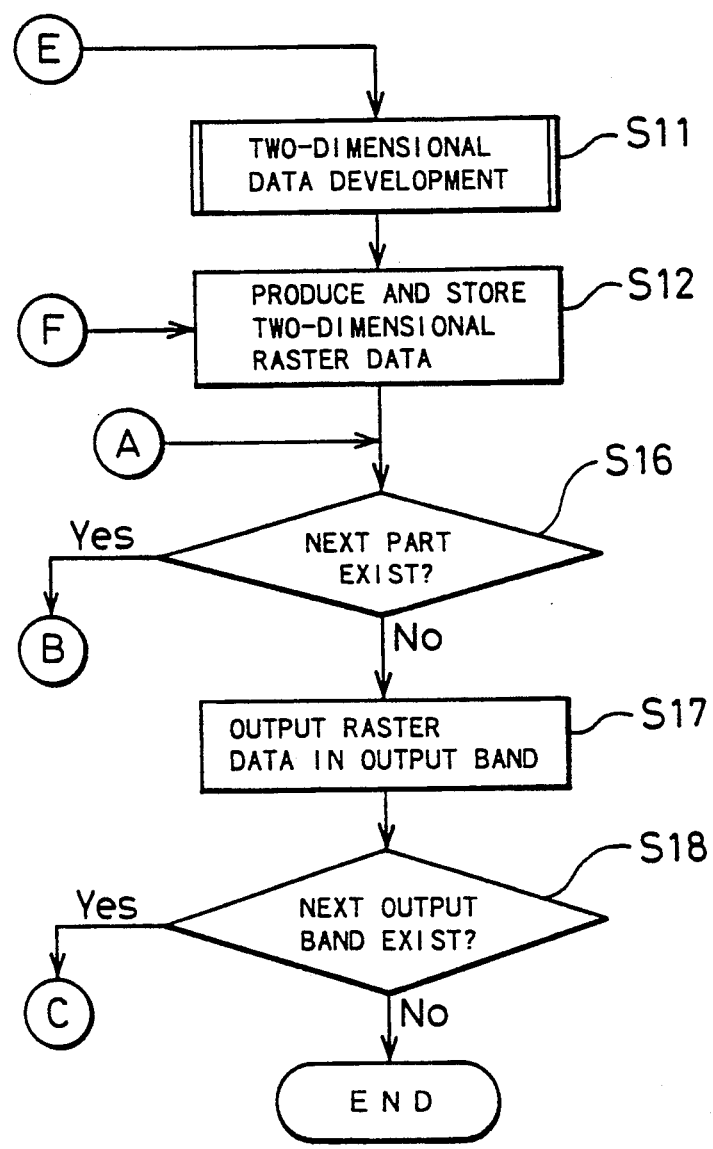

FIGS. 13A and 13B are flowcharts showing processing of the total image It shown in FIG. 3.

At step S1, a PDL program expressing the image It is output from the workstation 1 to the vector/raster converter 2, and the first CPU 221 translates the PDL program written in a higher level language into an intermediate language similar to a machine language.

At step S2, the image It is divided into the image parts LP0 through LP3 and FP0 through FP5. Namely, each image part is processed as separate data. Here, data of the image parts LP1 through LP3 including characters comprise several kinds of data, such as a character code, data representing a circumscribed rectangle thereof, and data defining position of the image part in the image It. On the other hand, data of the image parts LP0, FP0 and FP2 through FP5 including figures comprise contour vector data of the figure, vector data representing the circumscribed rectangle thereof, and data defining position of the image part in the image It. Data of the image part LP1 including a picture comprises vector data representing a circumscribed rectangle thereof and data defining the position in the image It.

The program then proceeds to step S3 at which affine conversion of the circumscribed rectangle of each image part is executed: the circumscribed rectangle of each image part is disposed at a specific position in the image It, and is enlarged or reduced, and rotated when required by the instruction of the PDL program. When the circumscribed rectangle is rotated, a quadrilateral which is circumscribed with the rotated rectangle and has four sides in parallel with the main scanning direction or the subscanning direction is defined as a new circumscribed rectangle. This is because that the circumscribed rectangle with the four sides in parallel with the main scanning direction or the subscanning direction is convenient for data development of image parts, especially small image parts.

At step S4, the image parts in the image It are classified. Namely, the image parts in the image It are classified by output bands. In the example of FIG. 3, the small image parts LP0 through LP3 belong to an output band D1. The large image parts FP0 through FP3 and FP5 exist over two output bands D1 and D2 and thus belong to both of the output bands D1 and D2. The large image parts FP0, FP1 and FP5 further belong to another output band D3.

The program proceeds to step S5, at which it is checked whether raster data of the image parts LP1 through LP3 of characters are stored in the character cache memory 237. Each time when a new character is developed to raster data, the raster data is stored in the cache memory 237 and information representing existence of the raster data in the cache memory 237 is stored in the memory 222.

At step S6, vector data of a character which is not stored in the character cache memory 237 is read out of the character font disk 4 and is subjected to the affine conversion. Namely, the contour vector of the character is corrected in the size and direction in the image It according to the instruction of the PDL program.

At step S7 and thereafter, raster data are created for each output band. Processing by output bands allows the raster data memories 234 and 235 to have relatively small capacities.

When the first output band D1 is selected at step S7, the program proceeds to step S8 at which image parts belonging to the output band D1 are successively picked up. In the embodiment, the image parts are selected in order of increasing priority, and the image parts LP0 through LP3 and FP0 through FP5 have priorities increasing in this order. Namely, the image part LP0 belonging to the first output band D1 is selected first.

At step S9, the first CPU 221 determines, when the image part selected at step S8 includes a character, whether the image part hits a character cache. When the image part hits the cache, the program proceeds to step S12 at which the second CPU 231 reads raster data of the character from the character cache memory 237.

The first CPU 221 and the second CPU 231 execute respective processing in synchronization. For this purpose, they synchronously communicates with each other via a synchronous communication line 270. The synchronous communication line 270 is also connected to the output interface 240.

Since the image part LP0 selected first at step S8 is of a figure, the program skips step S9 and proceeds to step S10.

At step S10, one of the two methods of data development is selected for generating intersection point information of the contour vector of the image part LP0 selected at step S8. The two methods are small-parts data development and large-parts data development. The small-parts data development is selected for image parts which have a circumscribed rectangle smaller than a predetermined threshold or reference value. On the other hand, the large-parts data development is selected for the image parts which have a circumscribed rectangle larger than the predetermined threshold.

The threshold of the circumscribed rectangle is previously determined based on the capacities of the memories 224 and 225 for storing intersection point information. As described above, in the small-parts data development, two-dimensional intersection point information is stored in the memory 224 or 225. This data development method is applied to the image parts LP0 through LP3 with relatively small circumscribed rectangles because all the two-dimensional intersection point information can be stored in one of the intersection point memories 224 and 225 for those image parts. On the other hand, the large-parts data development is applied to the image parts FP0 through FP5 with relatively large circumscribed rectangles.

The small-parts data development is selected for the first image part LP0 at step S10, and the program proceeds to step S11 accordingly.

At step S11, the two-dimensional data development (or the small-parts data development) is executed for the image part LP0, as described in the preceding section B-2. Detailed procedure of step S11 in FIG. 13 is shown in FIG. 5 by steps S111 through S115.

The program then proceeds to step S12 at which two-dimensional raster data of the image part LP0 are created as described in the preceding section B-2 and stored in the raster data memory 234 or 235.

When the image part hits the character cache at step S9, the program directly proceeds to step S12 at which raster data is read out of the character cache memory 237 and written in the raster data memory 234 or 235.

Raster data of the first image part LP0 belonging to the output band D1 are thus written in the raster data memory 234 or 235. The raster data is not output until the raster data for all of the image parts belonging to the current output band are written in the memory 234 or 235.

At step S16, it is judged whether another image part belonging to the current output band D1 exists.

In the embodiment, the image parts LP1 through LP3 are successively picked up and step S8 to step S16 are repeatedly executed for each image part.

On completion of the processing for the small image parts LP0 through LP3, the large image part FP0 is selected at step S8, and the program proceeds to steps S9, S10, S13 and thereafter.

At step S13, the one-dimensional data development (or the large-parts data development) is successively executed for the image parts FP0 through FP5 as described in the preceding section B-3. Steps S131 through S134 in the flowchart of FIG. 9 represent detailed procedure of step S13. Intersection point information on a certain scanning line is obtained at step S13 for all the large image parts FP0 through FP5 which is successively processed.

At step S14, one-dimensional raster data on the scanning line for the image parts FP0 through FP5 are created as described in the preceding section B-3 and stored in the raster data memory 234 or 235.

At step S15, it is judged whether another scanning line is left. When the answer is YES, the program returns to steps S13 and S14 at which raster data are created on a next scanning line.

Raster data of the image part FP1 of a picture are created as follows: Multi-tone image data representing a picture image are transmitted from the first CPU 221 to the raster image processor 250, which executes tone correction and color computation of the picture image. The image data processed by the image processor 250 is output to the second CPU 231, and screened by the dot generator 260 connected to the second CPU 231, thereby being converted into raster data, or halftone dot data.

After raster data for all the image parts belonging to the first output band D1 are created and written in the raster data memory 234 or 235, the program proceeds through step S16 to step S17. The raster data stored in the raster data memory 234 or 235 is output through the output interface 240 at step S17, and the image is recorded on the raster data by the image output unit 3 of FIG. 1. The image output unit 3 is not limited to a drum type unit of FIG. 1 but may be any available type.

On completion of the processing for the first output band D1, the program proceeds to step S18, at which it is judged whether another output band is left. When the answer is YES, the program returns to step S7 and the next output band D2 is processed.

In the embodiment described above, either of the two data development methods for intersection point information is selected based on the size of the circumscribed rectangle of each image part. This allows high speed creation of raster data for each image part and thereby those for the total image.

C. Modifications

The invention is not limited to the embodiment above, but there may be many modifications and changes without departing from the scope of the invention as follows.

(1) In the one-dimensional data development of the embodiment described above, raster data on each scanning line is produced after intersection point information on a certain scanning line is accumulated for plural large image parts which is successively processed. Alternately, raster data can be separately created for each image part. In the latter case, means for linking intersection point information of plural image parts with difference in layer (or priority) are not required; for example, the address pointer table PT2 and the intersection point data table IT2 can be omitted.

Processing of plural image parts together as the embodiment, however, makes the processing time shorter.

(2) Although one of the one-dimensional data development and the two-dimensional data development is selected based on the size of the circumscribed rectangle of each image part in the embodiment, a figure in any shape surrounding each image part may be used instead of the circumscribed rectangle. In general, processing method is selected based on the size of each image part.

In the one-dimensional data development, even when an image part is large and has a complicated contour, a relatively small memory capacity is sufficient for storing data of intersection points. In the two-dimensional data processing, on the other hand, two-dimensional raster data in each image part are created at a high speed. Since either of the two data processing methods is selected based on the size of each image part, high-speed creation of raster data for the total image is readily attained with a relatively small memory capacity.

Raster data creation based on accumulated black-and-white count $\Sigma C$ for each pixel makes the processing speed higher.

According to the odd-even rule for determining whether each intersection point is a start point or an end point of filling, the filling area and non-filling area can be formed only on the basis of the fact whether the accumulated count $\Sigma C$ is odd or even.

Since the writing flag is assigned to a pixel where a black-and-white count C is once registered in the small-parts data development, or where a black-and-white flag is once set in the large-parts data development, it is easily determined whether each intersection point is a starting point or an end point of filling even when the accumulated count $\Sigma C$ for the intersection becomes equal to zero. This makes it possible to fill pixels at the edge of an image part where the accumulated count $\Sigma C$ often becomes zero.

The total processing speed is improved by the use of two CPUs for separately producing intersection point information and raster data and by the the alternate selection of the two intersection point data memories.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing method for producing raster data of an image comprising a plurality of image parts, comprising the steps of:

sequentially selecting one of said plurality of image parts;

comparing the size of the selected one of said plurality of image parts with a predetermined reference size; and executing one-dimensional data processing for producing raster data representing a one-dimensional image portion of the selected one of said plurality of image parts when the selected one of said plurality of image parts is larger than said reference size, and executing two-dimensional data processing for producing raster data representing a two-dimensional image portion of the selected one of said plurality of image parts when the selected one of said plurality of image parts is smaller than said reference size.

2. An image data processing method in accordance with claim 1, wherein said one dimensional data processing comprises the steps of:

(a-1) sequentially selecting one scanning line;

(a-2) finding at least one intersection point of the selected scanning line with a contour of an image region within the selected one of said plurality of image parts;

(a-3) producing filling-indication data indicating whether each intersection point is a start point or an end point of filling along the selected scanning line; and (a-4) producing raster data of said one-dimensional image portion on the selected scanning line from said filling-indication data and image property data previously specified for each of said plurality of image parts.

3. An image data processing method in accordance with claim 2, wherein said two-dimensional data processing comprises the steps of:

(b-1) finding at least one intersection point of each scanning line with a contour of an image region within the selected one of said plurality of image parts;

(b-2) producing filling-indication data indicating whether each intersection point is a start point or an end point of filling along a scanning line; and (b-3) producing raster data of said two-dimensional image portion from said filling-indication data and image property data previously specified for each of said plurality of image parts.

4. An image data processing method in accordance with claim 3, wherein said image property data includes a halftone dot area rate and a screen ruling.

5. An image data processing method in accordance with claim 4, wherein said steps (a-2) and (a-3) are executed for a first set of plural image parts overlapping at least partly with each other before said step (a-4); and said step (a-4) further comprises the steps of:

(a-4-1) adding said filling indication data obtained for each image part of said first set of plural image parts with respect to each pixel on the selected scanning line to thereby obtain an added data for each pixel;

(a-4-2) accumulating said added data of each pixel along the selected scanning line to thereby obtain an accumulated data for each pixel; and (a-4-3) comparing said accumulated data for each pixel with a prescribed reference value on the selected scanning line to thereby produce raster data representing said one-dimensional image portion on the selected scanning line, where said one-dimensional image portion is blank on and after a first type pixel whose accumulated data is equal to said reference value and is filled on and after a second type pixel whose accumulated data is different from said reference value.

6. An image data processing method in accordance with claim 5, wherein said steps (b-1) and (b-2) are executed for a second set of plural image parts overlapping at least partly with each other before said step (b-3); and said step (b-3) further comprises the steps of:

(b-3-1) adding said filling indication data obtained for each image part of said second set of plural image parts with respect to each pixel on each scanning line to thereby obtain an added data for each pixel;

(b-3-2) accumulating said added data of each pixel along each scanning line to thereby obtain an accumulated data for each pixel; and (b-3-3) comparing said accumulated data for each pixel with said reference value on each scanning line to thereby produce raster data representing said two-dimensional image portion of said second set of plural image parts, where said two-dimensional image portion is blank on and after said first type pixel along each scanning line and is filled on and after said second type pixel along each scanning line.

7. An image data processing method in accordance with claim 6, wherein said reference value includes all of the even numbers and zero.

8. An image data processing method in accordance with claim 7, wherein said step (a-3) further comprises the step of:

setting a flag to each pixel where said filling indication data is produced; and at said step (a-4-3), said raster data is produced such that said one-dimensional image portion is filled on and after a third type pixel whose accumulated data is equal to said reference value and to which said flag is set.

9. An image data processing method in accordance with claim 8, wherein said step (b-2) further comprises the step of:

setting a flag to each pixel where said filling indication data is generated; and at said step (b-3-3), said raster data is produced such that said two-dimensional image portion is filled on and after said third type pixel.

10. An image data processing apparatus for producing raster data of an image comprising a plurality of image parts, comprising:

first means for sequentially selecting one of said plurality of image parts;

second means for comparing the size of the selected one of said plurality of image parts with a predetermined reference size;

third means for executing one-dimensional data processing for producing raster data representing a one-dimensional image portion of the selected one of said plurality of image parts when the selected one of said plurality of image parts is larger than said reference size; and fourth means for executing two-dimensional data processing for producing raster data representing a two-dimensional image portion of the selected one of said plurality of image parts when the selected one of said plurality of image parts is smaller than said reference size.

11. An image data processing apparatus in accordance with claim 10, wherein said third means comprises:

means for sequentially selecting one scanning line;

means for finding at least one intersection point of the selected scanning line with a contour of an image region within the selected one of said plurality of image parts;

means for producing filling-indication data indicating whether each intersection point is a start point or an end point of filling along the selected scanning line; and means for producing raster data of said one-dimensional image portion on the selected scanning line from said filling-indication data and image property data previously specified for each of said plurality of image parts.

12. An image data processing apparatus in accordance with claim 11, wherein said fourth means comprises:

means for finding at least one intersection point of each scanning line with a contour of an image region within the selected one of said plurality of image parts;

means for producing filling-indication data indicating whether each intersection point is a start point or an end point of filling along a scanning line; and means for producing raster data of said two-dimensional image portion from said filling-indication data and image property data previously specified for each of said plurality of image parts.

13. An image data processing apparatus in accordance with claim 12, wherein said image property data includes a halftone dot area rate and a screen ruling.

14. An image data processing apparatus in accordance with claim 13, wherein said means for producing raster data of said one-dimensional image portion further comprises:

means for adding said filling indication data obtained for each image part of a first set of plural image parts overlapping at least partly with each other with respect to each pixel on the selected scanning line to thereby obtain an added data for each pixel;

means for accumulating said added data of each pixel along the selected scanning line to thereby obtain an accumulated data for each pixel; and means for comparing said accumulated data for each pixel with a prescribed reference value on the selected scanning line to thereby produce raster data representing said one-dimensional image portion on the selected scanning line, where said one-dimensional image portion is blank on and after a first type pixel whose accumulated data is equal to said reference value and is filled on and after a second type pixel whose accumulated data is different from said reference value.

15. An image data processing apparatus in accordance with claim 14, wherein said means for producing raster data of said two-dimensional image portion further comprises:

means for adding said filling indication data obtained for each image part of a second set of plural image parts overlapping at least partly with each other with respect to each pixel on each scanning line to thereby obtain an added data for each pixel;

means for accumulating said added data of each pixel along each scanning line to thereby obtain an accumulated data for each pixel; and means for comparing said accumulated data for each pixel with said reference value along each scanning line to thereby produce raster data representing said two-dimensional image portion of said second set of plural image parts, where said two-dimensional image portion is blank on and after said first type pixel along each scanning line and is filled on and after said second type pixel along each scanning line.

16. An image data processing apparatus in accordance with claim 15, wherein said reference value includes all of the even numbers and zero.

17. An image data processing apparatus in accordance with claim 16, wherein said means for producing filling-indication data included in said third means comprises:

means for setting a flag to each pixel where said filling indication data is produced; and said means for comparing said accumulated data included in said third means produces said raster data such that said one-dimensional image portion is filled on and after a third type pixel whose accumulated data is equal to said reference value and to which said flag is set.

18. An image data processing apparatus in accordance with claim 17, wherein said means for producing filling-indication data included in said fourth means comprises:

means for setting a flag to each pixel where said filling indication data is generated; and said means for comparing said accumulated data included in said said fourth means produces said raster data such that said two-dimensional image portion is filled on and after said third type pixel.

19. An image data processing apparatus for producing raster data of an image including a plurality of image parts, comprising:

first means for producing intersection point information representing an intersection point of each scanning line with a contour of an image region within a selected one of said plurality of image parts;

a memory for storing said intersection point information; and second means for producing raster data from said intersection point infomration stored in said memory;

wherein said first means comprises:

means for sequentially selecting one of said plurality of image parts;

means for comparing the size of the selected one of said plurality of image parts with a predetermined reference size; and means for producing said intersection point information as one-dimensional intersection point information when the selected one of said plurality of image parts is larger than said reference size and producing said intersection point information as two-dimensional intersection point information when the selected one of said plurality of image parts is smaller than said reference size, wherein said intersection point information includes filling-indication data indicating whether each intersection point of each scanning line with a contour of an image region within the selected one of said plurality of image parts is a start point or an end point of filling.

20. An image data processing apparatus in accordance with claim 19, wherein said memory includes two memory units; and said apparatus further comprises a first switch and a second switch for connecting said first and second means alternately and complementarily to said two memory units such that said first means writes said intersection point information in one of said two memory units while said second means reads out said intersection information from the other of said two memory units to produce said raster data.

* * * * *